July 6, 1948.   C. A. BEESON   2,444,415
EMERGENCY ELECTRICAL GENERATING UNIT
Filed Feb. 21, 1946
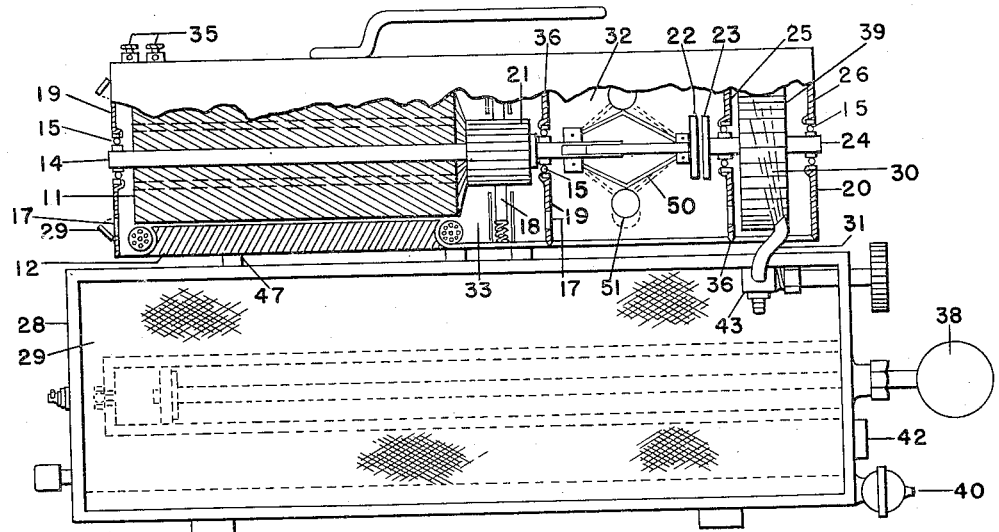
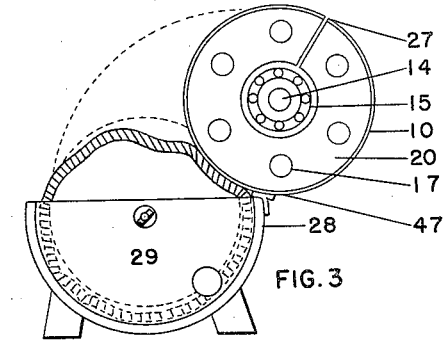
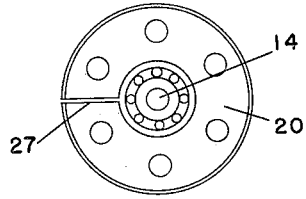
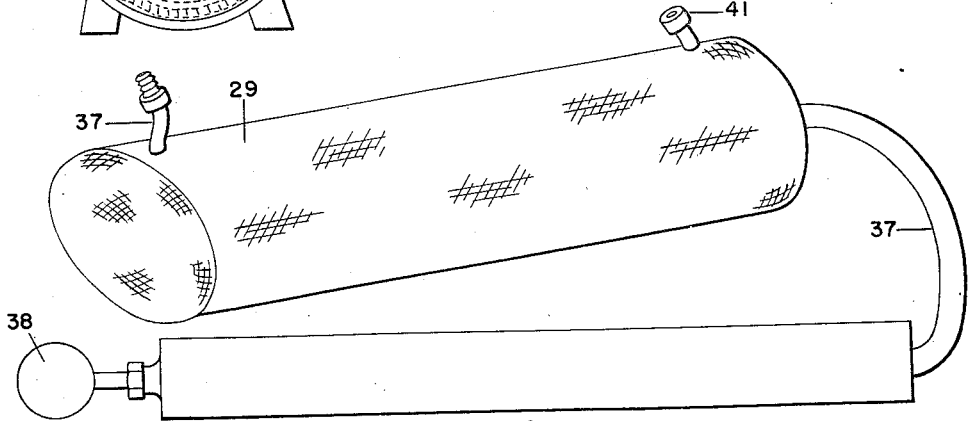
*INVENTOR.*
COLEMAN A. BEESON
BY
William D. Hall
Attorney Patented July 6, 1948

2,444,415

UNITED STATES PATENT OFFICE 2,444,415

EMERGENCY ELECTRICAL GENERATING UNIT

Coleman A. Beeson, Baltimore, Md.

Application February 21, 1946, Serial No. 649,449

6 Claims. (Cl. 290—52)

(Granted under the act of March 3, 1883, as amended April 30, 1928; 370 O. G. 757)

The invention described herein may be manufactured and used by or for the Government for governmental purposes, without the payment to me of any royalty thereon.

This invention refers to electrical generating equipment and more particularly to a portable self-contained generating unit that is operated by manually derived power.

Small generating equipment as usually provided for radio and other portable electrical devices has the disadvantage of being heavy, cumbersome, and subject to failure. Its motive power source has to be kept in operation continuously. Failure frequently occurs when the equipment's operative functioning is especially needed. The equipment is such that its power cannot be supplied by the surroundings or the individuals in charge of it on the premises unless they limit their capacity to operate the equipment while doing so. In a particular form, generating equipment is provided that can be manually operated by individuals, but such is heavy and does not provide for sufficient control to keep the generator tension uniform, or allow the user a rest during the period of use. Operators cannot operate the generator and the equipment used therewith effectively at the same time.

It is an object of this invention to provide a new and improved electrical generating unit that will avoid one or more of the disadvantages and limitations of the prior art.

A further object of the present invention is to provide a new and improved generating unit for energizing equipment that may be operated by individuals to provide a reserve motive power for operating the unit, without interfering with the operation of the equipment.

An additional object of this invention is to provide a new and improved generating unit for energizing equipment that will be capable of compact packing for transportation purposes, relatively light in weight, and economical to manufacture.

In the appended drawings, illustrating an embodiment of this invention, by way of example:

Figure 1 is a side elevation of an electrical generating unit embodying this invention, with portions broken away, Figure 2 is a rear view of Figure 1, Figure 3 is front end view, partly sectioned, and Figure 4 indicates the reservoir and pump used in Figure 1.

Similar reference characters refer to similar parts throughout the drawings.

For a better understanding of the invention, reference is made to the drawings and the following description, while the scope of the invention is particularly pointed out in the claims.

In the particular form shown in the drawings, an electrical generator unit consists of a cylindrical housing 10 in which a direct current generator 11 structure is assembled with its magnetic fields or polar pieces 12 attached to the inside surface of the housing adjacent one end. An armature 13 rotates within the fields and is designed and built to permit air for ventilating, to be blown therethrough, in passages provided. A shaft 14 supports the armature and runs in ball bearings 15 mounted in circular discs 19 and 20 respectively provided at the end and as a partition within the housing. These discs are perforated, having air holes 17 arranged suitably on a circular line and spaced from each other. These holes permit air to be blown through them towards the generator in a manner to be described. The commutator 21 of the armature is preferably placed towards the middle of the housing and brushes 18 take off the energy to be obtained therefrom as a source of current to the equipment to be supplied thereby. The shaft 14 extends through the discs and supports a centrifugal control that consists of weighted spheres 51 suspended on flat springy strips 50 that bend as the weights fly-out under centrifugal force. When the strips 50 bend they pull down on a driven clutch plate 22 and disengage it from another driving clutch plate 23, that is revolved by a turbine shaft 24. The shaft is supported in ball bearings 15 like those for the generator shaft 14, and the bearings in turn are centrally supported in discs 25 and 26 respectively mounted in the housing. The discs are preferably slit radially at 27 to enable them to open resiliently when inserted in the housing and fit into grooves 36 provided and located properly for the purpose, as indicated in Figure 3. This construction eliminates the need for bolts. The binding posts 35 connected on the housing exteriorly provide a coupling point for electrical conductors to attach to. Dust caps 29 are installed on the disc 19 to keep out the dust and moisture when the turbine is not operating. The end disc 26 is without ventilating holes. The housing 10 is provided with hinged legs 47 which connect to the framework 28 of a flexible canvas or plastic reservoir container 29 for air to drive the turbine 30. The turbine 30 is supported on the shaft 24 and has vanes 39 suitably arranged for the efficient use of compressed air coming through a nozzle 31 attached to the housing at a suitable angle and location. The air blows against the vanes and drives the turbine and after giving up its kinetic energy thereto exhausts through the air holes 17 in the adjacent disc 25 into the centrifugal control chamber 32, thence through the air holes in the disc 20, into the generator chamber 33. The air continues over the commutator and axially through the armature spaces, absorbing heat therefrom, and exhausting through the holes in the end disc 19.

The framework 28 is arranged to hold the flexible container 29 and its piping 37 in proper placement. An air compressor pump for manual operation is installed on the framework and operates through the use of its externally placed handle 38 in a conventional manner. The container has a drain plug 40 to let out accumulations of water and also an air inlet valve 41 for the supply of high pressure to the container, if conditions should permit. The flexible container is designed to collapse when not in use and take up little space. It is, at the same time lighter than most rigid materials that it takes the place of. A gauge 42 is provided to determine the air pressure that is in the container.

In the use of the device the container is manually pumped to a suitable pressure, and the valve 43 opened up to allow it to flow to the turbine vanes and revolve the shaft 24 which rotates the clutch plate 23. This plate engaging the clutch plate 22 induces it to rotate and with it, the shaft 14. This causes the generator to develop current and send it through its brushes to the equipment outside to be supplied. If the speed of the turbine becomes excessive, the weights of the centrifugal control fly out and reduce the amount of engagement between the clutch plates. This slows the generator up accordingly. This is done in such a manner as to keep the regulation of the generator current to a predetermined level. As the air flowing through the housing and generator absorbs heat, it tends to keep up the efficiency of the generator by holding it at a desirable temperature while a slight turning influence induced adds to this. The framework is so arranged with its flexible container that it will permit the generator housing to hingedly fold into it. This makes the device especially valuable for portable conditions. The unit serves to provide a practical structure for supplying current in small amounts for small electrical equipment, such as radio, where such energy is required. The container can be readily supplied with sufficient air to run the unit for a reasonable time, and during that time may be reinforced with more air pressure if desirable, or may be allowed to run without further filling for an appreciable period. The operator is not required to keep up the work of pumping continuously, but may do so intermittently, without interference to the operation and use of the generator at a controlled speed. He is able to manipulate the equipment effectively without stopping to pump up the air tank or container. This is of considerable importance at times, as it is frequently necessary for the operator to spend all his attention on the equipment. Any use of manual effort for the generator unit during operation of the equipment would interfere and render the equipment useless. The flexible container operates for a substantial period after a filling, and being automatic allows the operator to take care of the equipment effectively, without interruption during such period. The flexible nature of the container enables it to be squeezed to provide additional pressure if desired.

While it has been described what is to be considered an improved embodiment of this invention, it will be noted that various changes and modifications may be made therein without departing from the principles and spirit of the invention and coming within the scope of the appended claims.

1. A turbo-generator unit comprising a housing, a generator arranged in said housing, a turbine operable within the housing, a centrifugal control disposed within the housing between and joining the turbine and generator operably together, said control being adapted to adjust the speed transmitted from the turbine to the generator to certain predetermined value, a container for supplying air under pressure therefrom to said turbine, said turbine being arranged to exhaust said air driving it through the generator for absorbing heat therefrom generated therein and from thence out of the housing, and means in the housing for segregating the generator, control and turbine into separate chambers but allowing the passage of the air from the turbine chamber to the others, said container being collapsible and hingedly attached to said housing so as to permit the housing to be compactly closed together.

2. A turbo-generator unit comprising a housing, a generator arranged in said housing, a turbine operable within the housing, a centrifugal control disposed within the housing between and joining the turbine and generator operably together, said control being adapted to adjust the speed transmitted from the turbine to the generator to certain predetermined value, a container for supplying air under pressure therefrom to said turbine, said turbine being arranged to exhaust said air driving it through the generator for absorbing heat therefrom generated therein and from thence out of the housing, and means in the housing for segregating the generator, control and turbine into separate chambers but allowing the passage of the air from the turbine chamber to the others, said container being collapsible and hingedly attached to said housing so to permit the housing to be compactly closed together, said housing being cylindrical, and the means of disc form having ventilating holes therethrough, the disc cut to form an expansive resilient structure adapted to fit in predetermined portions of the housing.

3. A turbo-generator unit comprising a housing, electrical generating means disposed adjacent one end of said housing, a turbine in said housing aligned with said means, means connected with said turbine for empowering said generating means intermittently and predeterminedly in relation to its generation of current, a container of flexible material for holding gas under compression as a supply for the operation of said turbine, means for partitioning the housing and segregating the means and turbine from each other but arranged so that the flow of exhaust gases from the turbine will be permitted therethrough and the absorption of heat maintained thereby, and a framework hinged to the housing for holding said container and forming a base for the housing in one instance and as a encasing holder in another instance.

4. A turbo-generator unit comprising a housing, electrical generating means disposed adjacent one end of said housing, a turbine in said housing aligned with said means, means connected with said turbine for empowering said generating means intermittently and predeterminedly in relation to its generation of current, a container of flexible material for holding gas under compression as a supply for the operation of said turbine, means for partitioning the housing and segregating the means and turbine from each other but arranged so that the flow of exhaust gases from the turbine will be permitted therethrough and the absorption of heat maintained thereby, a framework hinged to the housing for holding said container and forming a base for the housing in one instance and as an encasing holder in another instance, said partitions being cut transversely to form a resilient attachment to the sides of the housings for holding themselves in position therein.

5. A turbo-generator unit comprising a housing, electrical generating means disposed adjacent one end of said housing, a turbine in said housing aligned with said means, means connected with said turbine for empowering said generating means intermittently and predeterminedly in relation to its generation of current, a container of flexible material for holding gas under compression as a supply for the operation of said turbine, means for partitioning the housing and segregating the means and turbine from each other but arranged so that the flow of exhaust gases from the turbine will be permitted therethrough and the absorption of heat maintained thereby, a framework hinged to the housing for holding said container and forming a base for the housing in one instance and as an encasing holder in another instance, said partitions being cut transversely to form a resilient attachment to the sides of the housings for holding themselves in position therein, said housing being grooved to take the peripheries of the partitions to facilitate said attachment and prevent longiutdinal movement thereof after placement in the housing.

6. A turbo-generator unit comprising a housing, electrical generating means disposed adjacent one end of said housing, a turbine in said housing aligned with said means, means connected with said turbine for empowering said generating means intermittently and predeterminedly in relation to its generation of current, a container of flexible material for holding gas under compression as a supply for the operation of said turbine, means for partitioning the housing and segregating the means and turbine from each other but arranged so that the flow of exhaust gases from the turbine will be permitted therethrough and the absorption of heat maintained thereby, a framework hinged to the housing for holding said container and forming a base for the housing in one instance and as an encasing holder in another instance, said partitions being cut transversely to form a resilient attachment to the sides of the housings for holding themselves in position therein, said housing being grooved to take the peripheries of the partitions to facilitate said attachment and prevent longitudinal movement thereof after placement in the housing, the hinging of the housing and holder being such that the weight of the housing may be applied to the container to express the gases therefrom.

COLEMAN A. BEESON.

REFERENCES CITED

The following references are of record in the file of this patent:

UNITED STATES PATENTS

| Number | Name | Date |
|---|---|---|
| 1,446,787 | Dake | Feb. 27, 1923 |
| 1,774,492 | Thorne | Aug. 26, 1930 |
| 2,005,486 | Wilson | June 18, 1935 |
| 2,079,724 | Van Ranst | May 11, 1937 |
| 2,285,775 | Keele | June 9, 1942 |

FOREIGN PATENTS

| Number | Country | Date |
|---|---|---|
| 224,805 | Great Britain | Nov. 20, 1924 |